US005517187A

United States Patent [19]
Bruwer et al.

[11] Patent Number: 5,517,187
[45] Date of Patent: May 14, 1996

[54] MICROCHIPS AND REMOTE CONTROL DEVICES COMPRISING SAME

[75] Inventors: Frederick J. Bruwer; Willem Smit; Gideon J. Kühn, all of Pretoria, South Africa

[73] Assignee: Nanoteq (PTY) Limited, Transvaal, South Africa

[21] Appl. No.: 19,821

[22] Filed: Feb. 18, 1993

Related U.S. Application Data

[63] Continuation of Ser. No. 707,101, May 29, 1991, abandoned.

[30] Foreign Application Priority Data

May 29, 1990 [ZA] South Africa .............. 90/4088

[51] Int. Cl.⁶ .................................. H04Q 9/00
[52] U.S. Cl. ............... 340/825.3; 340/825.31; 340/825.34; 340/825.56; 380/23
[58] Field of Search ............ 340/825.3, 825.31, 340/825.34, 825.2, 825.21, 825.56, 825.69, 825.72; 235/382.5; 307/10.2, 10.5; 361/172; 70/256; 380/23

[56] References Cited

U.S. PATENT DOCUMENTS

| | | | |
|---|---|---|---|
| 4,426,637 | 1/1984 | Apple et al. | 340/825.69 |
| 4,590,470 | 5/1986 | Koenig | 340/825.31 |
| 4,596,985 | 6/1986 | Bongard et al. | 340/825.31 |
| 4,652,860 | 3/1987 | Weishaupt et al. | 340/825.31 |
| 4,686,529 | 8/1987 | Kleefeldt | 340/825.69 |
| 4,723,121 | 2/1988 | van den Boom et al. | |
| 4,779,090 | 10/1988 | Micznik et al. | 340/825.31 |
| 4,835,407 | 5/1987 | Kataoka et al. | 307/10.5 |
| 4,847,614 | 7/1989 | Keller | 340/825.56 |
| 4,928,098 | 5/1990 | Dannhaeuser | 340/825.56 |
| 5,055,701 | 10/1991 | Takeuchi | 307/10.2 |

FOREIGN PATENT DOCUMENTS

| | | |
|---|---|---|
| 88116675 | 12/1989 | European Pat. Off. . |
| 0335912B1 | 3/1995 | European Pat. Off. . |
| 2606232 | 5/1988 | France . |
| 2607544 | 6/1988 | France . |
| 3532156 | 3/1987 | Germany . |
| 2133073 | 7/1984 | United Kingdom . |

*Primary Examiner*—Donald J. Yusko
*Assistant Examiner*—Edwin C. Holloway, III
*Attorney, Agent, or Firm*—Oblon, Spivak, McClelland, Maier & Neustadt

[57] ABSTRACT

Encoder and decoder microchips suitable for use in remote control devices, are disclosed. The encoder microchip comprises means for performing an encoding function on an identification number embedded in the said microchip and a combination of a unit number and a stepping counter value, so as to generate a transmission value which is only decodable by a related decoding function having access to the same identification number. The decoder microchip comprises means for decoding the transmission value into a decoded unit number and a decoded counter value and means for comparing the decoded counter value with a decoder counter value range. The encoder and decoder microchips are also provided with means for synchronizing the decoder microchip with a particular encoder microchip which has generated a synchronization command.

40 Claims, 7 Drawing Sheets

PB
0 PUSH BUTTON 1
1 PUSH BUTTON 2

TP
0 VOLATILE COUNTER
1 NON VOLATILE COUNTER

TX1 TX0
0   0   TRANSMITTER 0
0   1   TRANSMITTER 1
1   0   TRANSMITTER 2
1   1   TRANSMITTER 3

| CSR2 | MODE |
|---|---|

AAH NORMAL CODE
A5H PANIC  CODE
55H SYNC   CODE
XXH UTILITY CODE

| CSR1 | CSR0 | =COUNTER VALUE |
|---|---|---|

T= 1,8 mS (OR ANY OTHER SUITABLE TIME)

FIRST BIT CSR0 BIT 0
LAST BIT CSR3 BIT 7

MICROCHIPS AND REMOTE CONTROL DEVICES COMPRISING SAME

This application is a continuation of application Ser. No. 07/707,101, filed on May 29, 1991, now abandoned.

FIELD OF THE INVENTION

This invention relates to security systems. More particularly, the invention relates to microchips suitable for use in remote control devices, to remote control devices comprising the said microchips and to a security system.

BACKGROUND OF THE INVENTION

Remote control via radio frequency or infra red media is well known and very popular for the control of car alarms, building alarms and automatic garage door equipment.

Conventional remote control systems which are based on a unidirectional transmission with limited security features, are in common use and are available at relatively low prices.

More sophisticated devices based on bi-directional transmission systems and extensive handshaking, are also available on the market and are known to the applicant. However, because of their high cost and certain practical disadvantages, they are not widely used in commercial remote control devices.

The aforementioned conventional devices based on unidirectional transmission systems have two important shortcomings in tile context of a security application, namely firstly—the codes they are able to transmit are usually fixed and—secondly, the number of combinations of codes that they can transmit, is relatively small. Either of these shortcomings can lead to access being given to unauthorised persons.

Such unauthorised access can be obtained by way of an exhaustive search, in which all the different combinations are tested to see if they are accepted, something which could be done in a matter of minutes if an appropriate apparatus is used. As an alternative, a recording could be made of a transmission and this could be retransmitted to gain access. As a result, such conventional unidirectional systems can be accessed without the use of authorised remote control or other security devices.

Improved security can be derived from the known principle of code stepping or code hopping. U.S. Pat. Nos. 4,835,407 and 4,847,614, German Patent No 3 244 049 and German Patent Publications DE-OS-33 20 721, DE-OS-32 34 538, DE-OS-34 07 436 and DE-OS-34 07 469 describe this principle in more detail. South African Patent Specification No 89/8225 also describes a code hopping remote control system which is similar to the one described in U.S. Pat. No. 4,847,614.

U.S. Pat. No. 4,847,614 describes the generation, by a transmitter, of a different code word after each previous transmitting operation. Such new code word is produced anew by linking, according to a given function, starting from a stored original code word and the previously transmitted code word. The receiver operates in exactly the same way and compares the new code word it generates, by the same method, with the code word received from the transmitter. If the two code words agree, the centrally controlled locking system of the vehicle in which the apparatus is installed, is activated. If there is non-agreement, additional code words, say n code words produced in sequence by the receiver, are compared. Thereafter, if non-agreement persists after the n code words, tile receiver switches over to an increased security mode wherein two successive code words transmitted in sequence must be successfully compared before the central locking system of the vehicle is activated. This double comparison must take place within the next m code words generated at the receiver.

If the transmitting device and the receiving device are out of step by more than m+n, another signal is used to indicate to the receiver that it must search through its entire set of codewords in an attempt to synchronize.

An essential feature of this remote control apparatus is that the receiver merely compares the received code word with the code word generated by itself without decoding the received code word to its original elements. Thus, in tile event of non-agreement, and this will occur very often if the system is widely used in RF-devices, because of accidental reception from other users, this apparatus changes to an increased security mode, which is user unfriendly.

When it is in the high security mode, the receiver will force the user to operate his/her transmitter more than once.

A further essential feature of this remote control device is that the "window" of disagreement which is still acceptable to the apparatus, is applied to the received code word and the code word generated by the receiver. If the code words are not the same with the first attempt, the receiver generates a second code word which is then compared with the received code word. This process may have to be repeated as many times as the size of the "window" which has been built into the receiver algorithm.

Depending on the electronics in which this process is carried out, the size of the "window" and also the extent of disagreement between the first received code word and the first code word generated by the receiver, the reaction time for this apparatus could vary from transmission to transmission, and could be lengthy.

However, a serious problem in the operation of the system results when the situation occurs that the transmitter and receiver are out of step by more than n+m steps.

It is taught by the aforementioned patent that another signal is to be supplied to the receiver to indicate to it that a total search must be done to achieve synchronization. Because of the enormous number of possible code words ($>10^9$), it could take several minutes to succeed. This patent even suggests that the user opens the transmitter and removes its batteries to facilitate a short search.

Both of the above situations are user unfriendly. If this process is repeated often, it also presents a security risk. The battery removal suggestion further precludes the use of non-volatile memory elements (EEPROM) for the counter of the transmitter. The use of EEPROM in the transmitter would have offered several advantages such as the elimination of standby power requirements, a longer battery life, fewer synchronization actions required and a guaranteed forward stepping (higher security).

If this system must be expanded to decode two or more transmitters it will have to step through 2 (or more) x n code words if an unauthorised code word is received.

OBJECTS AND SUMMARY OF THE INVENTION

It is an object of the present invention to provide encoder and decoder microchips for use in a remote control system of increased security, of which the user friendliness has not been unduly sacrificed, comprising a transmitter remote control device and a receiver remote control device, wherein the transmitter remote control device comprises the encoder microchip, the encoder microchip forming part of an electronic circuit adapted to transmit a coded transmission value decodable by the decoder microchip, and wherein the receiver remote control device comprises the decoder microchip, the decoder microchip forming part of an electronic circuit adapted to receive and to decode the coded transmission.

It is a further object of the invention to provide a security system in which synchronization of the transmitter and receiver remote control devices can be achieved by a simple yet reliable and secure manner.

According to one aspect of the present invention, there is provided an encoder microchip comprising:

means for performing a non-linear encoding function on an identification number embedded in the said microchip and a combination of a unit number and a stepping counter value, so as to generate a transmission value which is only decodable by a related decoding function having access to the same identification number; and means for generating, upon a synchronization command being given thereto, a counter value which is encodable together with the synchronization command, to generate a synchronization transmission value which will facilitate the synchronization of a related decoder microchip having the same identification number.

The encoding function may be described by the following equation:

$$\text{fen}_{code} \text{ (Identification number, (unit number, counter value))} = \text{transmission value.}$$

The encoding and related decoding functions are, as stated above, non-linear functions. This type of function is often used in the field of cryptography and is usually chosen for its characteristics which prevent or at least inhibit the prediction of its next output even though the non-linear function as well as previous outputs thereof may be known, as long as the identification number (PIN) remains unknown.

The unit number may be at least a one bit value. Although it may extend into thousands of bits and even more, it will be appreciated that the longer the unit number, the greater the security it offers but more expensive the microchip becomes.

The counter value is also preferably of more than a one bit length and may also extend into thousands of bits and even more, which will as would be appreciated, increase the security. The longer the counter value, however, the higher the cost.

It has been found that a 16 bit unit number and a 16 bit counter value, when combined, give adequate security because they could each individually be combined in more than 65,000 different combinations and together they could be combined in more than 4000 million combinations. Similarly, the identification number is preferably of more than a one bit length and is preferably as long as 64 bits in which case more than $10^{19}$ different combinations are possible.

The transmission value is preferably at least 16 bits long. It will be appreciated that if it is of a length less than 16 bits, it will be less secure and consequently it will be easier to be decoded.

According to another aspect of the invention, there is provided a decoder microchip comprising:

means for performing a decoding function on a received transmission value and an identification number embedded in the decoder microchip, so as to generate from the transmission value, a decoded unit number and a decoded counter value;

means for comparing the decoded counter value with a decoder counter value range; and means, upon a valid synchronization command having been decoded by the decoder microchip, for synchronizing the decoder counter value with the counter value of an encoder microchip which has generated the synchronization command.

According to a further aspect of the invention, there is provided a decoder microchip comprising:

means for performing a decoding function on a received transmission value and an identification number embedded in the decoder microchip, so as to generate from the transmission value, a decoded unit number and a decoded counter value;

means for comparing the decoded counter value with a decoder counter value range;

means for recognising, in the decoded unit number, a synchronization command; and means for storing the decoded counter value in the event of a valid transmission value having been received.

The decoder microchip may comprise means for performing a format scan on signals so as to identify and respond to valid transmission values.

The decoding function performed by the decoder microchip is preferably such as to ensure that the decoded unit number and the decoded counter value are the same as, respectively, the unit number and the counter value encoded by an encoder microchip having the same identification number as the decoder microchip.

The decoder microchip preferably also comprises distinguishing means for distinguishing between a decoded unit number for normal operation and a synchronization command.

The decoder counter value may conveniently not be accepted by the decoder microchip as a valid counter value unless it is greater than the previously received valid counter value but less than the previously received valid counter value plus a value n, the value n constituting the number of lost codes the encoder microchip would still accept. Alternatively, in the event that the decoded unit number comprises a valid synchronization command, the decoder microchip may be adapted to store the decoded counter value plus one as the decoder counter value for subsequent use.

The decoder microchip may, in addition, comprise means for comparing the counter value with a value obtained from a unidirectional synchronization process to which the decoder microchip may be subjected.

Also according to the invention, there is provided a system having both a encoder and decoder microchip comprising:

means for performing a non-linear encoding function on an identification number embedded in the said encoder microchip and a combination of a unit number and a stepping counter value, so as to generate a transmission value which is only decodable by a related decoding function having access to the same identification number;

means for generating, upon a synchronization command being given thereto, a counter value which is encodable together with the synchronization command, to generate a synchronization transmission value which will facilitate the synchronization of a related decoder microchip having the same identification number;

means for performing a decoding function on a received transmission value and an identification number embedded in the decoder microchip, so as to generate from the transmission value, a decoded unit number and a decoded counter value;

means for comparing the decoded counter value with the decoded counter value range; and means, upon a valid synchronization command having been decoded by the decoder microchip, for synchronizing the decoder counter value with the counter value of an encoder microchip which has generated the synchronization command.

According to a further aspect of the invention, there is provided a transmitter remote control device comprising encoder means and transmission means adapted to transmit a transmission value receivable by a receiver remote control device capable of responding thereto, the encoder means comprising means for performing an encoding function on an identification number embedded in the encoder means and a combination of a unit number and a variable counter value so as to generate a transmission value incorporated in the transmission, the transmission value being decodable through a related decoding function performed by the receiver remote control device.

The encoder means may be adapted to generate a stepping counter value through a uni-directional synchronization process for the synchronization of the encoder means of the receiver remote control device.

Also according to the invention, there is provided a receiver remote control device comprising decoder means comprising means for performing a decoding function on a combination of a transmission value and an identification number, so as to generate a decoded unit number and a decoded counter value; and means for comparing the decoded counter value number with a counter value range.

The receiver remote control device is preferably provided with means for providing an output indicative of or in response to a valid transmission value it has received.

The receiver remote control device may further comprise means for comparing the decoded counter value with a decoded counter value obtained from a uni-directional synchronization process preperformed on the receiver remote control device by a transmitter remote control device.

The counter values of both the encoder means and the decoder means may be retained by batteries or alternatively, by memory means.

In a preferred embodiment of the invention, electronic remote control apparatus is provided comprising encoder means for generating, when activated, a multibit code word by performing a function on a personal identification number (PIN) and a combination of a unit number and a counter value. Preferably, the counter value is incremented every time the apparatus is activated.

The electronic remote control means preferably comprises transmitter means for generating a transmission comprising the multibit code word. Conveniently, the encoder means is further adapted to generate, upon activation of a synchronization process, a synchronization multibit code word, wherein the synchronization multibit code word is a function of a personal identification number embedded in the encoder means, and a combination of a synchronization command word and a new counter value.

The encoder means may further comprise panic means adapted to generate a panic command.

Additionally, the encoder means may comprise electrically erasable programable memory means or read and write memory means with standby mode means in the said encoder means to store the last counter value.

In order to facilitate the programming of a multibit personal identification number (PIN) into the memory means, the apparatus may comprise program means.

As an additional safety feature, the encoder means may comprise verification means for verifying the personal identification number without being able to read it, and means for locking an interface with the personal identification number (PIN), in order to bar all further attempts to change or verify the personal identification number.

In another preferred embodiment of the invention there is provided electronic remote control apparatus comprising decoder means for decoding the multibit code word received from the transmitter means.

The decoder means may be adapted to apply a function on the multibit code word received from the receiver in such a manner as to yield the unit number and the counter value to which the encoding function had been applied.

Preferably the personal identification number (PIN) of the encoder means is the same as that of the decoder means, otherwise the unit number and the counter value window of the decoder means would most probably not compare with the unit number and counter value to which the encoder means had applied the function and the received code word would then be ignored.

The decoder means is preferably adapted to compare the decoded unit number of the transmitted code word with its pre-embedded unit number, and upon agreement, to check that the counter value falls inside a valid range of counter numbers, and if both conditions are satisfied, to give an indication thereof to the outside, in the form of a flag, and to store the received counter value if it was found to be valid.

The decoder means may further be adapted, if one of the conditions is not satisfied, to ignore the received multibit code word and to scan its input for another multibit code word.

Each of the encoder and decoder means may comprise means for programming, verifying and locking a personal identification number (PIN).

In addition the decoder means may comprise means for storing the latest valid received counter value.

Further according to the invention, the encoder means may comprise means for recognising, within a sequence of counter values, a false counter value, and means responsive thereto for preventing desynchronization. The means for preventing desynchronization may be adapted to also give a battery low indication.

Furthermore, the encoder means may comprise means for stepping the synchronization command word to prevent the same synchronization command word from being used illegitimately.

Also according to the invention, the decoder means may comprise means for recognising a panic command generated in the encoder means, and means for responding thereto.

The decoder means may comprise means for recognizing other commands and/or more than one unit number with independent counters, without having to perform the decoding process more than once.

BRIEF DESCRIPTION OF THE DRAWINGS

The invention will now be described, by way of a non-limiting example, with reference to the accompanying drawings in which.

DESCRIPTION OF PREFERRED EMBODIMENTS

Figure 1:
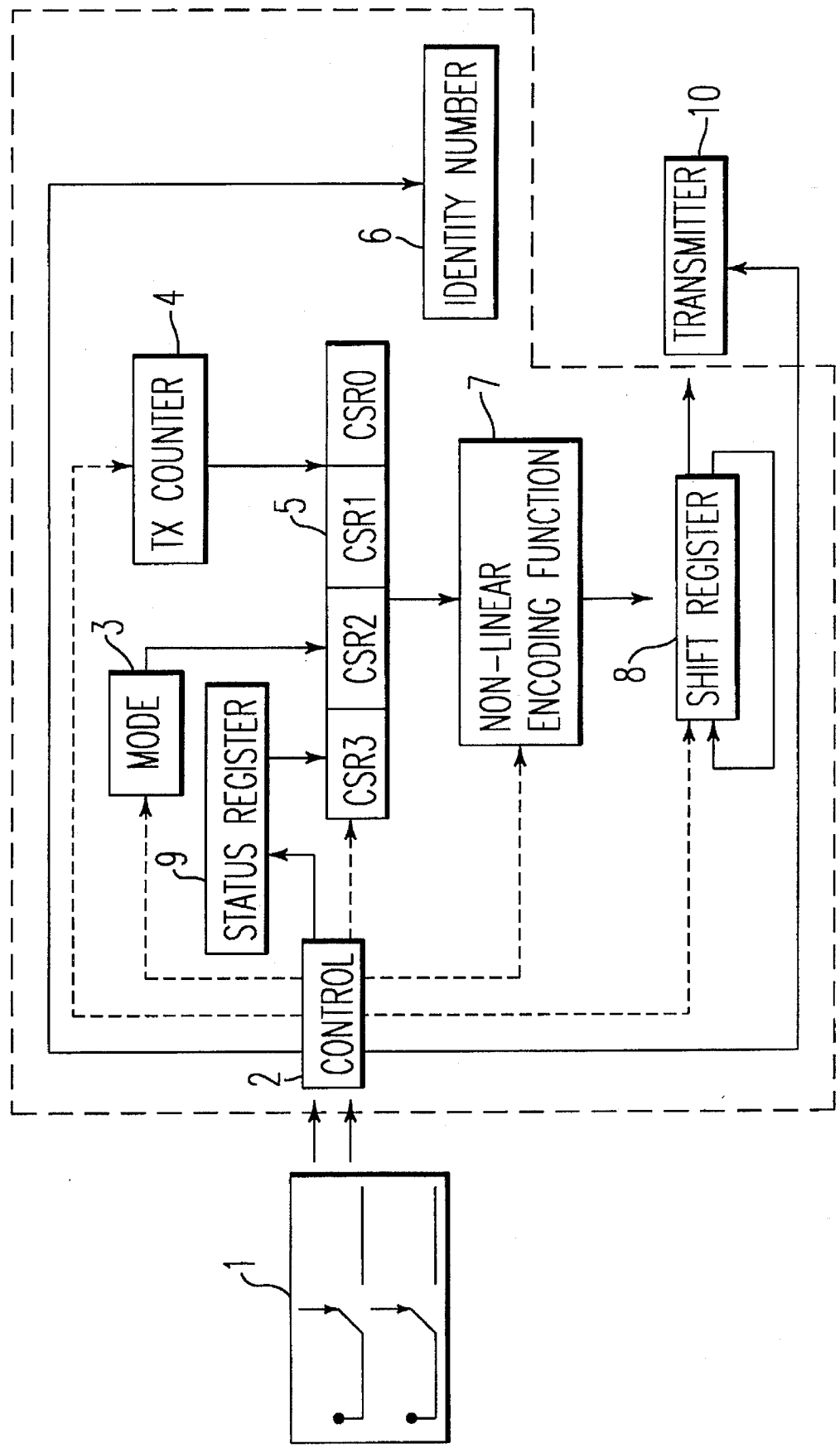
FIG. 1 is a block diagram of an encoder microchip in accordance with the invention.

Referring to FIG. 1, the encoder microchip receives an input from a pair of switches (1), and comprises a control unit (2), a mode unit (3), a transmit counter (4), an input register (5) for holding an input word, an identity number register (6) for holding an identity number, logic means (7) for performing a non-linear function, a shift register (8) for holding an encoded value and repeatedly feeding the encoded value to a transmitter (10), and a status register (9) for holding the configuration of the encoder microchip. The status register (9), the identity number register (6) and the transmitter counter (4) are all registers or memory elements that can be programmed into the microchip and may be non-volatile (EEPROM) or volatile (RAM) memory with battery backup. As will be appreciated by those skilled in the art, the functions of the encoder microchip can be implemented in dedicated logic although a microprocessor based implementation is also possible.

Figure 2:
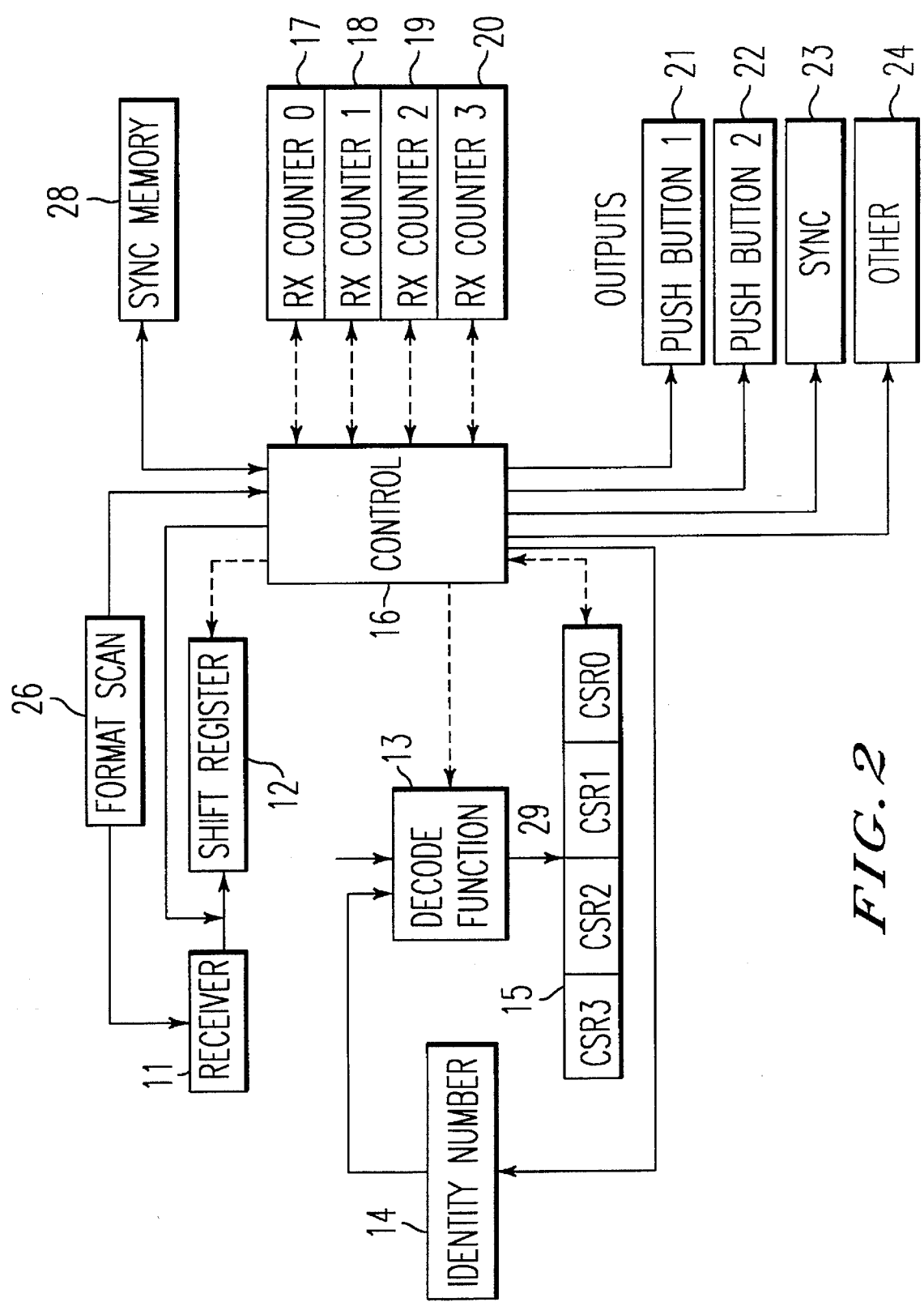
FIG. 2 is a block diagram of a decoder microchip in accordance with the invention.

Referring to FIG. 2, there is shown a receiver (11) for receiving a transmission value from the transmitter (10). The output of the receiver (11) is fed into a shift register (12). The value in the shift register (12) is decoded by decoding logic (13) using an identity number obtained from an identity number register (14). The result obtained from the decoding logic (13) comprises a decoded unit number and a decoded counter value and is stored in a decoded result register (15). All the aforementioned steps are carried out under the control of a control unit (16). The decoder microchip also comprises four counter registers respectively numbered (17), (18), (19) and (20) in which decoder counter values may be stored and from where they may be compared with decoded counter values obtained by the control unit (16) from the decoded result register (15). Four outputs respectively numbered (21), (22), (23) and (24) are also provided and may be used by the control unit (16) to indicate what kind of information has been received.

The decoder microchip further comprises format scan means (26) for scanning and verifying the format of any transmissions received by the receiver (11).

In order to prevent a synchronization value which has been used for one synchronization command, from being used for subsequent synchronization commands, synchronization memory means (28) are provided.

Figure 5:
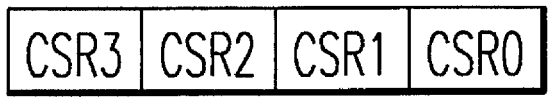
FIG. 5 is a preferred format for the unit number and the counter value.
Figure 5:
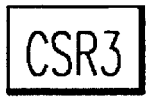
Figure 5:
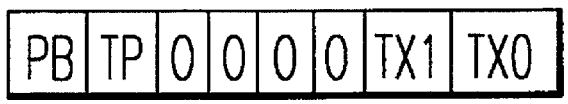

The identity number stored in identity number register (6) of the encoder is programmed by the user with a secret value to provide the security of the system. Although there may be millions of other users of exactly the same encoder (FIG. 1) and decoder (FIG. 2) microchips, every user will have a very high degree of security. A decoder microchip will only be able to correctly decode a transmission value that has originated in an encoder microchip when the same identity number is programmed into it. Furthermore, a specific encoder will also be defined by the value of its status register (9). The format of the status register is shown in FIG. 5.

There can also be more than one input (1) into the control device, which will also influence the status register value (9).

The transmit counter (4) can be programmed with an initial value and will then increment every time the encoder is used to transmit a value.

Figure 6:
FIG. 6 is a preferred format for the transmission value.
Figure 6:
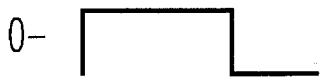
Figure 6:
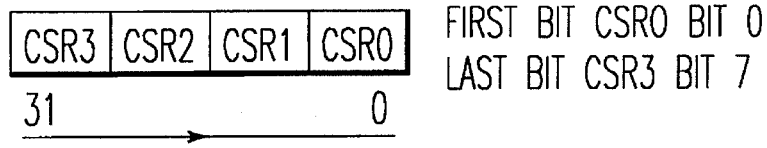
Figure 6:
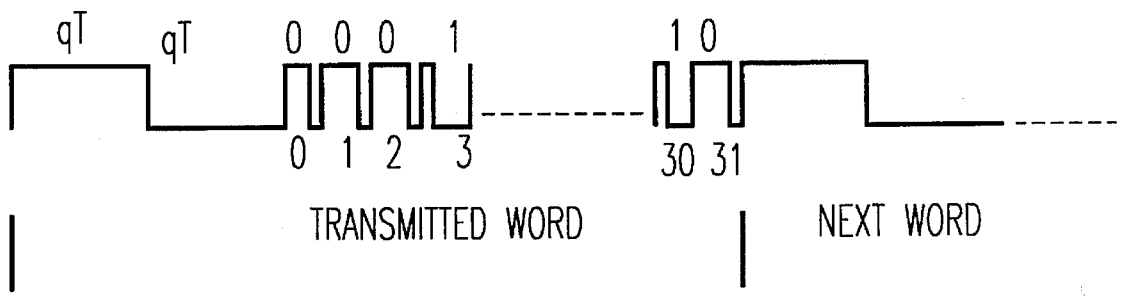

The input word (5) to the encoding function comprises the unit number (CSR3 and CSR2 in the input register (5)) and the transmit counter value (CSR1 and CSR0 in the input register (5)). The non-linear encoding function (7) will use the identity number stored in identity number register (6) to map the input word (5) to a transmission value that is stored in the transmission shift register (8). This value can be further encoded to form the transmission format as shown in FIG. 6.

The non-linear function may be any non-linear function of sufficient complexity and which has a related decoding function i.e. if the non-linear decoder function is applied to the transmission value using the same identity number, it will produce as a result the value that was in the input word stored in input register (5).

Figure 3:
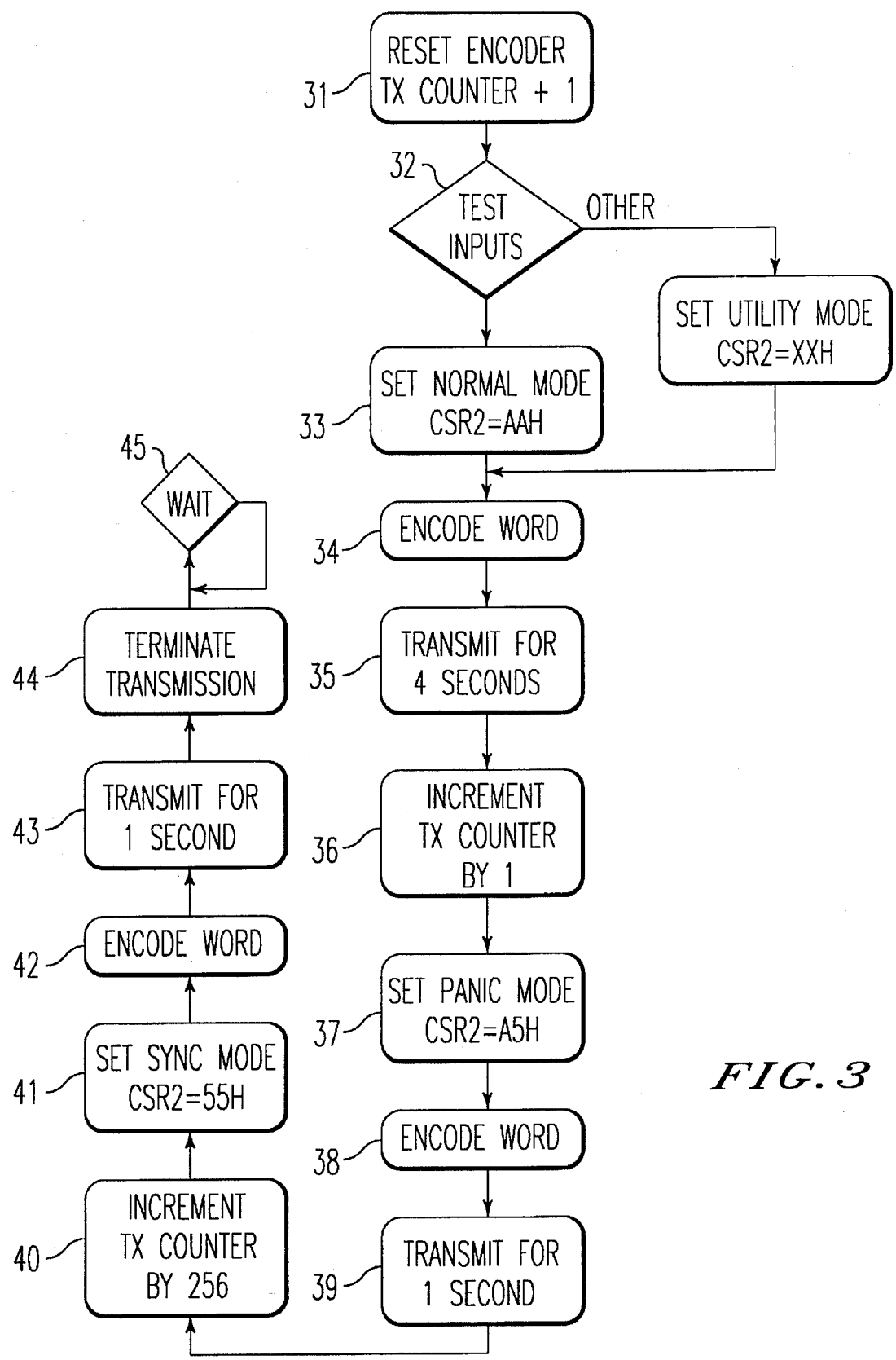
FIG. 3 is a flow diagram for the functions which the encoder microchip can perform.

The encoder operation is explained in the flow diagram of FIG. 3. When power is applied to the encoder microchip it would perform its functions in the sequence indicated. It would first reset itself to a defined state in order to start with normal operation (31). It is important to recognise that the operation of the encoder can at any time be terminated. If it is not terminated, it will sequentially execute the functions indicated in FIG. 3, until the wait loop (45) is reached. The encoder microchip will suspend its activities at this point and will perform no further functions until a reset function (31) is performed. The test shown in step (32) could be based on the inputs received from the switches (1) to the control unit (2).

A more detailed description of the encoder operation shown in FIG. 3 will now be provided. Upon activation the encoder will perform the following actions sequentially until terminated. The first action (31) will be to reset itself. Then the encoder will increment the transmitter counter value, an action that is repeated every time the encoder is activated to transmit a value.

Next the inputs will be tested (32) to determine whether a normal or other (utility) command is required. The inputs will also influence the status register. Based on the inputs the appropriate command value would be loaded into the CSR2 register part of the unit number. If in (32) a normal mode is determined CSR2 is set to AAH, otherwise CSR2 is set to XXH. The encoding operation (34) will now take place to create the transmission value from the input word (5). The transmission value will be transmitted for four seconds (35). If the encoder is still activated after this time it will proceed to increment the transmitter counter value again (36) and to load the CSR2 register with a different value, A5H, for example the "panic" command value (37) before encoding the input word again (38). The resulting transmission value will again be transmitted for a period of time (1 second) (39).

If the transmission has still not been terminated, the encoder operation will proceed to perform a synchronization sequence. This may include incrementing the transmitter counter value by 256 (40) and setting the CSR2 value to 55H to indicate a synchronization command (41). It will then again encode the input word before transmitting it (42, 43). After 1 second (43) the encoder will terminate all further transmissions and will perform an endless wait loop until it is deactivated (45). It should be noted that the transmit sequence may be terminated at any time.

The synchronization sequence may perform some other tests on the counter to further establish it as a synchronization counter value for example the lower 8 bits of the counter value must be forced to zero.

The transmission word (8) must be at least as long as the input word (5), but need not be the same length as the identity number stored in identity register (6). Security requirements dictate that the transmit counter (4) should be at least 16 bits long and so too the unit number. This indicates that a good length for the transmission word is 32 bits. This provides ample security and is also practical in terms of transmission time and implementation costs.

Figure 4A:
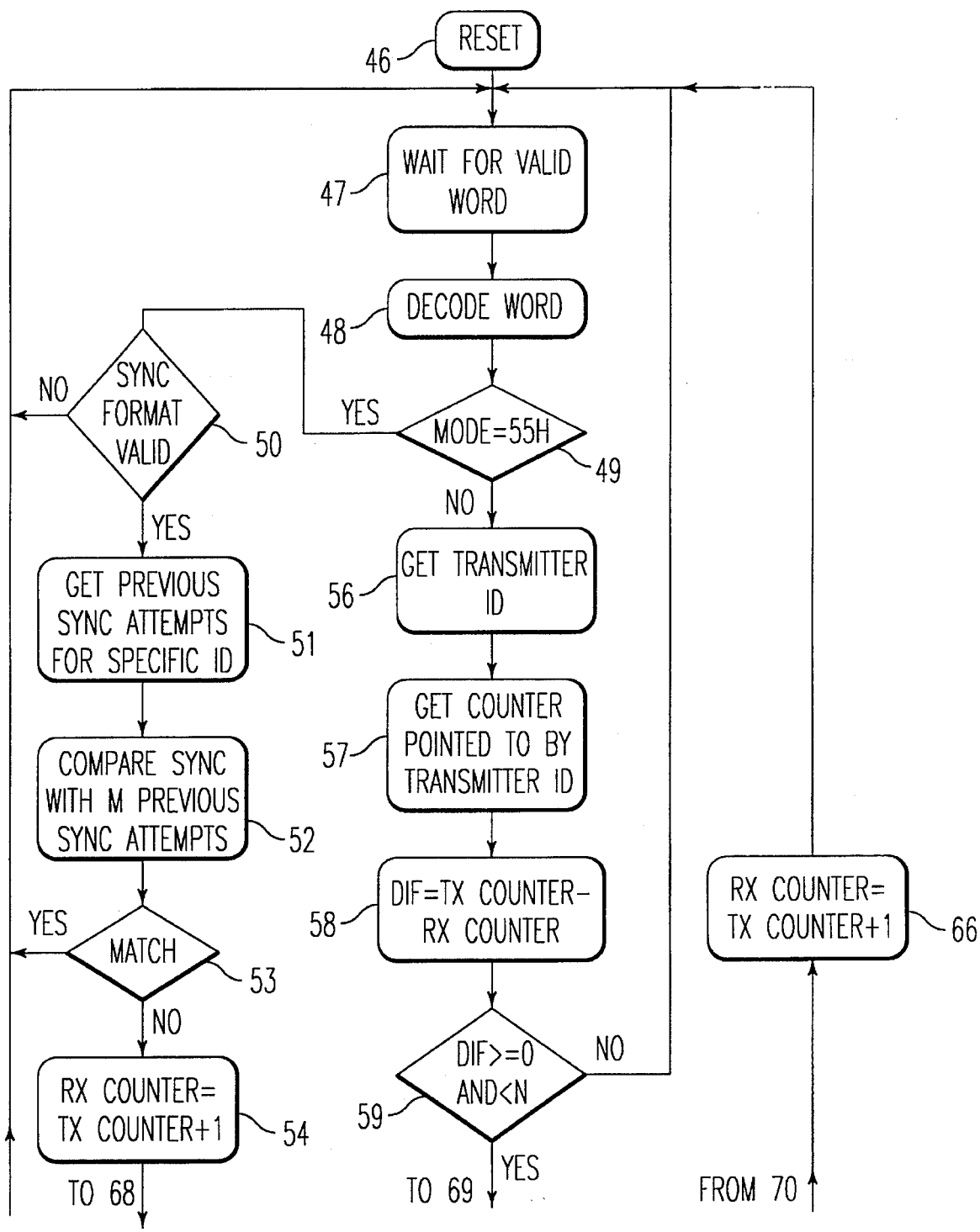
FIG. 4a and 4b are a flow diagram for the functions which the decoder microchip can perform.
Figure 4B:
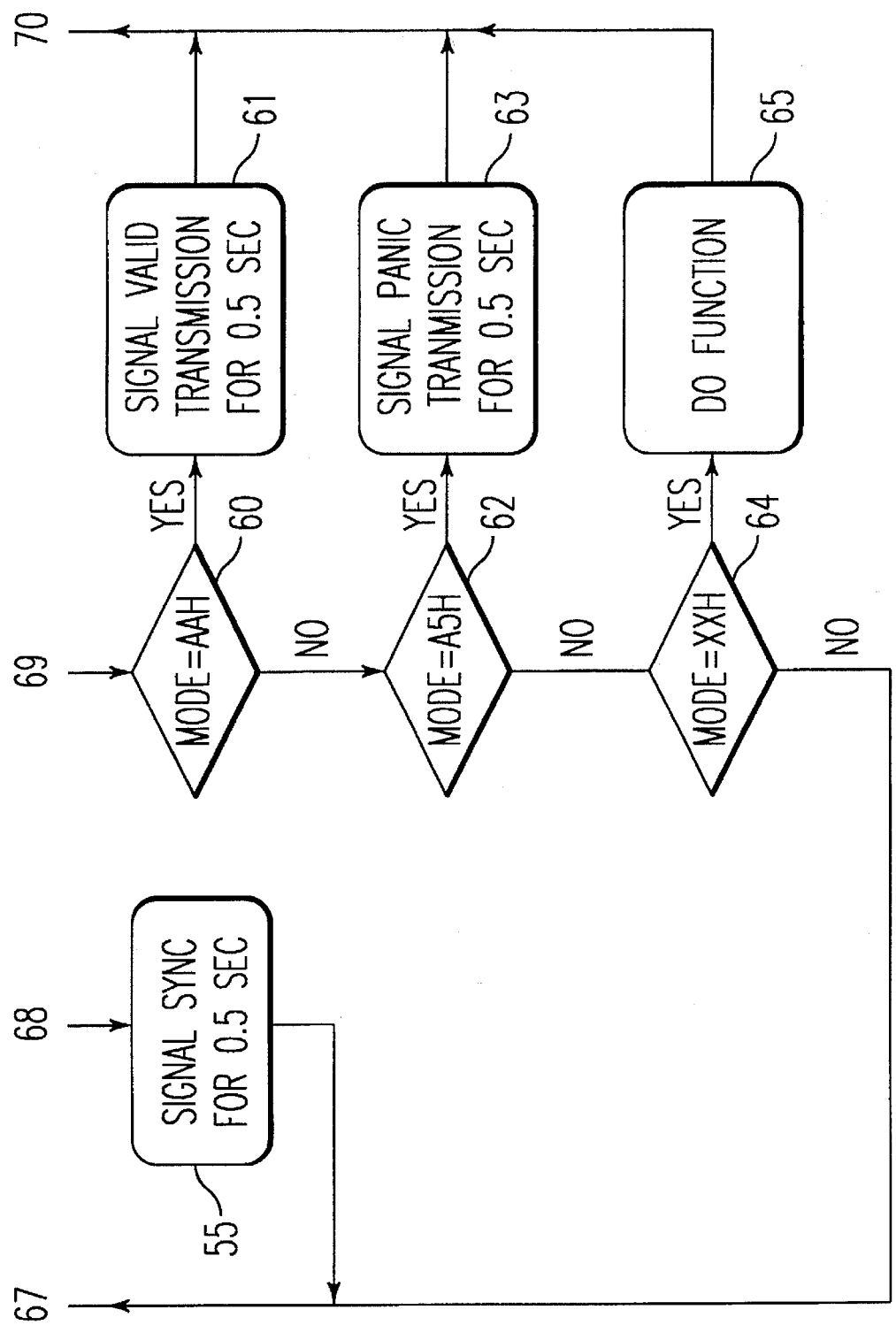

The functions and operation of the decoder microchip are substantially more complex and would be described with the help of simple examples. The block diagram in FIG. 2 shows the functional elements of the decoder microchip and the flow diagram in FIGS. 4 and 4a shows its operation.

It should be clear from the encoder description that all information bits to be transmitted are encoded with the non-linear encoding function. This has the effect that the transmission value (8) bears no obvious resemblance to the input word (5). However, at the decoder the information embedded in the input word must be recovered.

The receiver (11) turns the transmitted signals, whether they are in the form of radio frequency, infra red waves or any other suitable medium, into a digital signal. Upon activation, the decoder will reset itself to a known state as is customary for electronic integrated circuits (46). This digital signal in the receiver (11) is continuously scanned (26, 47) from a word that conforms to the format such as shown in FIG. 6. Another format may be chosen if it has advantages. When a valid transmission word is recognised, it is moved into the decoder input shift register (12). The control (16) of the decoder microchip would then apply the decoding function (13) with inputs from the preprogrammed decoder identity number stored in identity number register (14), to the value in the input shift register (12). The result of this decoding operation (48) is stored in the decoded unit number and decoded counter value result register (15).

The next operation (49) is to compare the value in the CSR2 (see FIG. 5) which is part of the unit number which is in turn part of the decoded result with the code for a synchronization command. If they compare, the decoder will proceed with operation (50) along the path on the flow diagram that shows the uni-directional synchronization operation.

If they do not compare, it will proceed to get (56) the transmitter identity from the decoded result register (15) and the counter value pointed to the transmitter identity (57). The control (16) will then calculate the difference (58) between the decoded counter value and the corresponding Rx counter value (17, 18, 19, 20). If the difference is greater than or equal to zero but less than a value n, the decoded value is accepted as the result of an authorised or valid transmission. The value n is the number of lost codes which the system may be set up to handle.

In practice, this means that a remote control system comprising a transmitter and a receiver, i.e. an encoder and decoder set with identical identity numbers stored in identity number registers (6, 14), does not have to remain in perfect synchronization.

For example, if n is say 100, then the transmitter, once it has been synchronized can be activated, for instance, 98 times out of range of the receiver (dummy transmissions) and if on the 99th time it is activated, the transmission is within range of the receiver, the decoder performs one decoding operation and will then accept the transmission as valid. If however, more than 100 (for n=100) dummy transmissions have taken place, the receiver will ignore all further transmissions from that transmitter until it receives a transmission value that decodes into a valid synchronization command.

If the decoded result was accepted as valid (59), the control can then determine what command was transmitted (60, 61, 64) and can then take the desired action (61, 63, 65), before returning to a state where it scans (47) for a valid word. The decoded counter value of a valid transmission will be incremented and stored (66) in the corresponding Rx counter register (17, 18, 19, 20). This means that once a transmission has been received as valid, the counter value of that transmission and all previous counter values will become unacceptable to that decoder microchip.

The uni-directional synchronization process is essential for establishing synchronization between a matched transmitter and receiver. If in operation (49) the transmission is recognised as possibly a synchronization command, the control will proceed to perform further tests to verify (50) that the format of the counter conforms to the requirements for a synchronization command. For example, the lower 8 bits of the decoded counter value must be zero. If the format does not conform to specifications for a synchronization command, the control takes the decoder microchip back to operation (47) and the decoded value is ignored.

If the decoded value passes test (50) the decoder will proceed to test the synchronization counter value against a previous valid synchronization operation (51, 52) and if it recognises a repeat, the decoder will ignore this decoded word (53) and will return to (47). However, if the command passes to (54) the decoder counter value will immediately be modified to the decoded value plus one. This value may be any possible value within the constraints of counter length and of course the format requirements of the synchronization command. The decoder will give an indication (55) that it has accepted the new counter value. In an automotive application, this might be used to turn the flicker lights on and off as an indication to the user that synchronization has been achieved.

In terms of security, it should be noted that although the decoder counter has been synchronized, the decoder will still need to receive a valid transmission based on the new counter value before it will indicate a valid reception (61, 63, 65).

The synchronization command and for that matter any other command cannot be determined from an investigation of the transmission value, because of the non-linear effect of the encoding function and the fact that it forms part of the input word which gets encoded.

It is very important to achieve the highest possible security in the synchronization process because it is always a weak point in a uni-directional system. Because the window n can be large and EEPROM can be used to store counter values, synchronization will only rarely be required. Other users will have no effect on the operation of a matched encoder/decoder set. This set will automatically keep in step without any actions by the user.

Synchronization is a very simple and straightforward process with very limited impact on the user, since it takes only a few seconds and does not require any additional signals or actions. Because of the fact that synchronization values cannot be repeated in a non-volatile memory application, a high degree of security is offered by the system.

We claim:

1. A system which includes an encoder microchip and a decoder microchip, wherein:

said encoder microchip comprises:

means for storing an identification number, means for storing a counter value, means for changing the value of said counter value each time the encoder microchip is operated, and encoding means for performing a nonlinear encoding function on said counter value using said identification number, so as to generate a transmission value;

said decoder microchip comprises:

means for storing a second identification number, means for receiving said transmission value from said encoder microchip, means for performing a decoding function on said transmission value using said second identification number, so as to generate from said transmission value a decoded counter value, means for storing a second decoded counter value obtained from the decoding of a transmission value of a previous transmission by said means for performing a decoding function; and means for performing a format scan on signals so as to identify signals conforming to a specific format.

2. An encoder microchip comprising:

means for storing an identification number;

means for storing a counter value;

means for changing the value of said counter value only when the encoder microchip is operated; and encoding means for performing an encoding function on at least said counter value using said identification number, so as to generate a transmission value.

3. An encoder microchip as claimed in claim 2, further comprising:

means for indicating a low power supply voltage condition.

4. An encoder microchip as claimed in claim 2, wherein said encoding means generates said transmission value decodable to provide said counter value.

5. A transmitter remote control device, comprising:

an encoder microchip as claimed in claim 2;

means for modulating the transmission value; and means for transmitting the modulated transmission value to a matched receiver remote control device.

6. An encoder microchip as claimed in claim 2, further comprising:

means for forming a unit number selected from the group consisting of information representing a command, information representing an input value, information representing a transmitter number and a constant value;

wherein said encoding means performs an encoding function on said counter value and on the unit number using said identification number, so as to generate said transmission value.

7. An encoder microchip as claimed in claim 6, further comprising:

synchronization means for generating, when required, a synchronization counter value and a synchronization unit number;

means for combining said synchronization counter value and said synchronization unit number to produce a combined value, said combined value being encoded by said encoding means performing said encoding function thereon, using said identification number, so as to generate a synchronization transmission value.

8. An encoder microchip according to claim 6, comprising:

means for storing information selected from the group consisting of information representing a command, information representing a transmitter number and information representing a constant.

9. An encoder microchip as claimed in claim 6 wherein said unit number also contains information on a technology used in the encoder.

10. An encoder microchip as claimed in claim 6, wherein said encoding means generates said transmission value decodable to provide said counter value and said unit number.

11. A system which includes an encoder microchip according to claim 2 and a decoder microchip which comprises:

means for storing a second identification number;

means for receiving said transmission value from said encoder microchip;

means for performing a decoding function on said transmission value using said second identification number, so as to generate from said transmission value at least a decoded counter value; and means for storing a second decoded counter value obtained from the decoding of a transmission value of a previous transmission by said means for performing a decoding function.

12. A system as claimed in claim 11, said decoder microchip comprising distinguisher means for distinguishing between a decoded unit number for normal operation, a decoded unit number for synchronization purposes, and a decoded unit number for other command purposes.

13. A system as claimed in claim 11 further including receiving means for receiving a transmission value from a matched transmitter remote device.

14. A system as claimed in claim 11, further comprising:

means for comparing the decoded counter value with the second decoded counter value stored in the means for storing a decoded counter value obtained from the decoding of a transmission value of the previous transmission, and for accepting or rejecting the transmission value as respectively valid or invalid according to whether or not the decoded counter value falls within a predetermined range of said second decoded counter value;

wherein said means for performing said encoding function performs said encoding function on said counter value and a unit number using said identification number, and said means for performing a decoding function generates from said transmission value said decoded counter value and a decoded unit number.

15. A system as claimed in claim 14, said decoder microchip comprising:

means for comparing the decoded counter value and the decoded unit number with a predetermined format and, upon a valid format having been received by the decoder microchip, for synchronizing the decoder counter value of the said decoder microchip with the counter value of the encoder microchip.

16. A system as claimed in claim 14, wherein said decoder microchip comprises means for providing at least one output indicative of information contained in an accepted decoded transmission value.

17. A system as recited in claim 14, wherein said means for comparing accepts or rejects said transmission value as respectively valid or invalid when said decoded counter value is within only a forward range of a previously decoded counter value.

18. A system as claimed in claim 14, wherein said decoder microchip comprises means for storing a plurality of counter values, each being related to a different encoder microchip.

19. A system as claimed in claim 18, wherein said decoder microchip comprises means for selecting a counter value from the plurality of counter values, based upon information derived from the decoded unit number.

20. A transmitter remote control device, comprising:
  encoder means for performing an encoding function on an identification number embedded in the encoder means and a combination of a unit number and a variable counter value so as to generate a transmission value, said counter value depending on a number of times the encoding function is performed; and
  a transmitter for modulating and transmitting said transmission value.

21. A transmitter remote control device as claimed in claim 20, wherein said unit number is derived from information selected from the group consisting of information representing a command, information representing an input value, information representing a transmitter number, a constant value, and information representing a technology used in the encoder.

22. An encoder microchip as claimed in claim 20, wherein said encoding means comprises a non-linear encoder.

23. A decoder microchip comprising:
  first means for storing an identification number;
  second means for storing at least a first counter value;
  output means;
  input means for data;
  means for performing a decoding function on the received data using said identification number so as to generate a second counter value;
  third means for comparing the second counter value with the first counter value;
  activating means for activating, if a comparison carried out by said third means shows that the second counter value is within a defined range of the first counter value the output means; and
  storage means for storing information relating to said second counter value in the second means if said output is activated.

24. A decoder microchip according to claim 23, comprising:
  receiver means for receiving signals; and
  means for performing a format scan on received signals so as to identify and act on values of valid format.

25. A system as recited in claim 23, wherein said means for activating activates said output means when said second counter value is within only a forward range of said first counter value.

26. A decoder microchip according to claim 23, wherein the output means, when activated, provides an indication of information contained in an accepted decoded transmission value.

27. A decoder microchip according to claim 23, wherein the output means provides an indication of at least one of predetermined different transmitter modes contained in an accepted decoded transmission value.

28. A decoder microchip according to claim 23, wherein the second storage means stores a plurality of counter values, each being related to a different encoder microchip.

29. A decoder microchip according to claim 28, comprising:
  means for selecting a counter value from the plurality of counter values based upon information derived from the unit number.

30. A decoder microchip as claimed in claim 23, comprising:
  activating means for activating, if a comparison carried out by said third means shows that the second counter value is within a defined range of the first counter value, the output means.

31. A decoder microchip as claimed in claim 30, comprising:
  fourth means for storing reference information selected from the group consisting of information representing at least one command, and information representing a constant value;
  wherein said means for performing a decoding function performs a decoding function on the received data using said identification number so as to generate said second counter value and a second unit number containing information selected from the group consisting of information representing a command, information representing an input value, information representing a transmitter number, a constant value, and information representing a technology type; and
  fifth means for comparing at least part of the unit number with at least part of the reference information.

32. A decoder microchip according to claim 31, comprising:
  means for distinguishing between different commands in said command information contained in the unit number.

33. A remote control system which comprises a transmitter and a receiver, the transmitter comprising:
  first means for storing a first identification number;
  second means for storing a counter value which is related to a number of times the transmitter is activated;
  means for performing an encoding function on the first identification number and on the counter value so as to generate a transmission value; and
  means for transmitting the transmission value to the receiver and indicating an activation of the transmitter to a user;
  the receiver comprising:
  third means for storing a second identification number which is the same as the first identification number;
  means for receiving said transmission value; and
  means for performing a decoding function, using the second identification number, on the received transmission value, so as to generate a decoded counter value.

34. A remote control system as claimed in claim 33, comprising:
  fourth means for storing a unit number comprising information selected from a group consisting of information representing a command, information representing an input value, information representing a transmitter number, a constant value and information representing a technology used in the encoder;
  wherein:
  said means for performing an encoding function performs an encoding function on the first identification number and on a combination of the counter value and the unit number so as to generate said transmission value; and said means for performing a decoding function performs a decoding function, using the second identification number, on the received transmission value, so as to generate at least said decoded counter value and a decoded unit number.

35. A remote control system which comprises a transmitter and a receiver, the transmitter comprising:

first means for storing a first identification number;

second means for storing an encoder counter value;

means for performing an encoding function on at least the first identification number and the encoder counter value so as to generate a transmission value, the encoder counter value being dependent on a number of times the encoding function is performed; and means for transmitting the transmission value to the receiver and indicating an activation of the transmitter to a user;

the receiver including:

third means for storing a second identification number which is the same as the first identification number;

means for receiving said transmission value;

means for performing a decoding function, using the second identification number, on the received transmission value, so as to generate at least a decoded counter value that is the same as the encoder counter value;

fourth means for storing the decoded counter value;

means for comparing the decoded counter value to the decoder counter value which is stored in the fourth means and which was generated from a preceding received transmission value;

means for determining whether the decoded counter value falls within a particular range with regard to the decoded counter value; and means for causing a value related to the decoded counter value to be stored in the fourth means if the comparison shows that the decoder counter value is within a said particular range.

36. A system as recited in claim 35, wherein said means for determining determines whether said decoded counter value if said decoded counter value is within only a forward range of said decoded counter value stored in said fourth means.

37. An encoder microchip, comprising:

means for storing an identification number, means for storing a counter value, means for forming a unit number selected from the group consisting of information representing a command, information representing an input value, information representing a transmitter number and a constant value, means for changing the Value of said counter value each time the encoder microchip is operated, and encoding means for performing an encoding function on said counter value and on said unit number using said identification number, so as to generate a transmission value;

wherein said unit number is modified related to a length of time that the encoder is operated.

38. An encoder microchip comprising:

a counter having a counter value;

a memory connected to said counter;

an encoder connected to said counter and said memory for incrementing said counter, for performing an encoding function on said counter value using an identification number stored in said memory and for generating a transmission value.

39. A decoder microchip comprising:

a memory having a stored counter value from a previous transmission;

a input data port;

a decoder, connected to said memory and said input data port, for performing a decoding function on data received by said input data port using an identification number stored in said memory and for generating a decoded counter value;

a comparator connected to said decoder and said memory;

an output circuit; and an output activation circuit, connected to said comparator and said output circuit, for activating said output circuit, for comparing said decoded counter value to the stored counter value, and for storing said decoded counter value in said memory, if said decoded counter value is within a defined range of said stored counter value.

40. A decoder microchip as recited in claim 39, wherein said output activation circuit activates said output circuit when said decoded counter value is within only a forward range of said stored counter value.

* * * * *